(12) United States Patent
Linnemann et al.

(10) Patent No.: US 12,479,476 B2
(45) Date of Patent: Nov. 25, 2025

(54) DETERMINING CRITICALITY FOR AUTONOMOUS DRIVING

(71) Applicant: ZF Friedrichshafen AG, Friedrichshafen (DE)

(72) Inventors: Andreas Linnemann, Ravensburg (DE); Martin Bollmann, Oberteuringen (DE); Tobias Merk, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 327 days.

(21) Appl. No.: 18/040,719

(22) PCT Filed: Jul. 15, 2021

(86) PCT No.: PCT/EP2021/069699
§ 371 (c)(1),
(2) Date: Feb. 6, 2023

(87) PCT Pub. No.: WO2022/028840
PCT Pub. Date: Feb. 10, 2022

(65) Prior Publication Data
US 2023/0322268 A1    Oct. 12, 2023

(30) Foreign Application Priority Data
Aug. 7, 2020   (DE) ............ 10 2020 210 014.4

(51) Int. Cl.
*B60W 60/00*    (2020.01)
*B60W 30/095*   (2012.01)

(52) U.S. Cl.
CPC .... *B60W 60/0027* (2020.02); *B60W 30/0953* (2013.01); *B60W 30/0956* (2013.01);
(Continued)

(58) Field of Classification Search
CPC ......... B60W 60/0027; B60W 30/0953; B60W 30/0956; B60W 60/0011; B60W 2554/20;
(Continued)

(56) References Cited

U.S. PATENT DOCUMENTS

| | | | |
|---|---|---|---|
| 2017/0101093 A1* | 4/2017 | Barfield, Jr. | ....... G08G 1/09675 |
| 2020/0223443 A1* | 7/2020 | Gonzalez Aguirre | ...................... B60W 40/10 |
| 2020/0356828 A1* | 11/2020 | Palanisamy | ............ G05D 1/024 |

FOREIGN PATENT DOCUMENTS

| | | |
|---|---|---|
| CN | 108428343 A | 8/2018 |
| DE | 102012007389 A1 | 10/2013 |

(Continued)

OTHER PUBLICATIONS

Do, Chuong (2008). "The Multivariate Gaussian distribution". Retrieved from https://cs229.stanford.edu/section/gaussians.pdf (Year: 2008).*

(Continued)

*Primary Examiner* — Tiffany P Young
*Assistant Examiner* — Ashleigh Nicole Turnbaugh
(74) *Attorney, Agent, or Firm* — Dority & Manning, P.A.

(57) ABSTRACT

A control unit (22) is configured for calculating a criticality ($I_{cri}$) of a driving situation as an overlap integral of an object function ($O_{ego}$) of an ego vehicle (10) with one or multiple object function(s) ($O_n$) of other road users or other static or dynamic objects in the surroundings of the ego vehicle (10). A method for calculating a criticality ($I_{cri}$) of a driving situation as an overlap integral of an object function ($O_{ego}$) of an ego vehicle (10) with one or multiple object function(s) ($O_n$) of other road users or other static or dynamic objects in the surroundings of the ego vehicle (10) is also provided.

16 Claims, 7 Drawing Sheets

(52) U.S. Cl.
CPC ..... B60W 60/0011 (2020.02); *B60W 2554/20* (2020.02); *B60W 2554/4042* (2020.02); *B60W 2555/20* (2020.02)

(58) Field of Classification Search
CPC ..... B60W 2554/4042; B60W 2555/20; B60W 30/095; B60W 2554/404; B60W 2556/20; B60W 60/001
USPC .......................................................... 701/23
See application file for complete search history.

(56) References Cited

FOREIGN PATENT DOCUMENTS

| | | |
|---|---|---|
| JP | 2002040131 A | 2/2002 |
| JP | 2015230547 A | 12/2015 |

OTHER PUBLICATIONS

International Search Report (English Translation) PCT/EP2021/069699, dated Oct. 25, 2021. (3 pages).
Althoff, Matthias. "Reachability Analysis and its Application to the Safety Assessment of Autonomous Cars" Retrieved from the Internet: https://mediatum.ub. tum.de/doc/963752/64217 5.pdf, p. 88-p. 131, figure 5.
Eggert, Julian et al. "A Foresighted Driver Model derived from Integral Expected Risk" 2019 IEEE Intelligent Transportation Systems Conference (ITSC), Auckland, New Zealand, 2019, pp. 1223-1230, doi: 10.1109/ITSC.2019.8916978.
Houenou, Adam et al. "Risk assessment for Collision Avoidance Systems". 17th International IEEE Conference on Intelligent Transportation Systems (ITSC), Qingdao, China, 2014, pp. 386-391, doi: 10.1109/ITSC.2014.6957721, (p. 386 p. 389; figure 1).
Reichardt, Dieter et al. "Collision avoidance in dynamic environments applied to autonomous vehicle guidance on the motorway," Proceedings of the Intelligent Vehicles '94 Symposium, Paris, France, 1994, pp. 74-78, doi: 10.1109/IVS.1994.639475.
Schmidt, Christian. "Fahrstrategien zur Unfallvermeidung im Straßenverkehr für Einzel- und Mehrobjektszenarien" [Driving Strategies for Accident Avoidance in Traffic for Single- and Multiple-Object Scenarios]), KIT Scientific Publishing, Karlsruhe, 2013, 174 pages, ISBN: 978-3-7315-0198-5.
Wolf, Michael T. et al. "Artificial potential functions for highway driving with collision avoidance," 2008 IEEE International Conference on Robotics and Automation, Pasadena, CA, USA, 2008, pp. 3731-3736, doi: 10.1109/ROBOT.2008.4543783.
English translation of Chinese Office Action for Application No. 202180057665.4 Dated Apr. 1, 2025.

* cited by examiner

DETERMINING CRITICALITY FOR AUTONOMOUS DRIVING

CROSS-REFERENCE TO RELATED APPLICATIONS

The present application is related and claims priority to 102020210014.4 filed in the German Patent Office on Aug. 7, 2020 and to PCT/EP2021/069699 filed in the European Patent Office on Jul. 15, 2021, both of which are incorporated by reference in their entirety for all purposes.

TECHNICAL FIELD

The present disclosure relates generally to the technical field of vehicle sensor systems and their data evaluation, in particular for autonomous or semi-autonomous vehicles. The present disclosure also relates generally to the technical field of the risk assessment of a driving situation within the scope of motion planning.

TECHNICAL BACKGROUND

Autonomous or semi-autonomous vehicles have sensors, such as, for example, cameras, and radar and LIDAR sensors, which detect the surroundings of the vehicle by sensing, and the data of the radar and LIDAR sensors are evaluated in a control unit by suitable software. On the basis of the information obtained by this data processing, a control unit can automatically initiate and carry out closed-loop braking, velocity, gap, compensation, and/or evasive maneuvering control using appropriate actuators.

A precise detection of surroundings is important for powerful driver assistance systems and autonomous vehicles. For this purpose, modern vehicles have a plurality of sensors, for example, radar, LIDAR, or camera sensors, which deliver their measured values in the form of a point cloud. It is important to obtain reliable information regarding possible objects in the driving path or on a collision course with the host vehicle from the point clouds provided by the sensors. In addition, it is important that the autonomous vehicle can evaluate the accident risk of the driving situation.

One known method is the use of TTC (Time-to-Collision) or THW ("Time Headway" as a measure for the criticality of a driving situation as described by Saffarzadeh et al. in "A general formulation for time-to-collision safety indicator," Transport vol. 166 issue TRS. The TTC is an important time-based safety indicator for detecting rear-end collisions in the assessment of road safety. Saffarzadeh et al. incorporate a linear acceleration of the objects into the TTC calculation. The use of TTC for criticality determination is disadvantageous, however, since this results in miscalculations of the criticality at different or variable velocities of an ego vehicle.

An approach to "motion planning" is described by C. Schmidt in "Fahrstrategien zur Unfallvermeidung im Straßenverkehr für Einzel and Mehrobjektszenarien" [Driving Strategies for Accident Avoidance in Traffic for Single- and Multiple-Object Scenarios]), KIT Scientific Publishing, Karlsruhe, ISBN: 978-3-7315-0198-5. Here, the last possible maneuver for a single object is initially derived on the basis of achievable location circles and expanded to arrive at a complete evasive maneuver. Thereafter, the consideration is expanded to include any number of objects and collision-free trajectories are determined and evaluated on the basis of location areas and kinematic configurations. On the basis of a precise mapping of the possibility of lateral movement of the vehicle, "pass-through gates" can be postulated, through which the ego vehicle must pass in order to avoid any type of collision with the involved obstacles.

In motion planning, obstacles are also described, for example, as mathematical functions, which are also referred to as "potential fields."

For example, D. Reichardt and J. Shick discuss, in "Collision avoidance in dynamic environments applied to autonomous vehicle guidance on the motorway," Proceedings of the Intelligent Vehicles '94 Symposium, DOI: 10.1109/IVS.1994.639475, an approach for automatic vehicle guidance on a highway with the intention of avoiding collisions. Surroundings information is provided in this case by multiple vision sensor modules and stored in a central dynamic database. By data fusion and data interpretation, a system view of the surroundings is generated, which is based on the data stored in the dynamic database, the data representing the current scene. This system view is transformed into a risk map representation, which integrates information regarding the road, the relative position and velocity of obstacles, and traffic signs.

Michael T. Wolf and Joel W. Burdick present, in "Artificial potential functions for highway driving with collision avoidance," IEEE International Conference on Robotics and Automation, 2008, DOI:10.1109/ROBOT.2008.4543783, a set of possible function components, which can assist an automated or semi-automated vehicle in navigating a multi-lane, populated highway. The resulting potential field is constructed as a superposition of disparate functions for lane-keeping, road-staying, speed preference, and vehicle avoidance and passing. The construction of the vehicle avoidance potential is of primary importance, incorporating the structure and protocol of laned highway driving. Particularly, the shape and the dimensions of the potential field behind each obstacle vehicle can appropriately encourage control vehicle slowing and/or passing, depending on the cars' velocities and surrounding traffic. Hard barriers on roadway edges and soft boundaries between navigable lanes keep the vehicle on the highway, with a preference to travel in a lane center.

Techniques of motion planning that make use of potential fields are often complex with respect to implementation, however. Example aspects of the invention improve such techniques and, in particular, make such techniques implementable in a resource-efficient manner.

SUMMARY OF THE INVENTION

The control unit according to example aspects of the invention is designed for calculating a criticality of a driving situation as an overlap integral of an object function of an ego vehicle with one or multiple object function(s) of other road users or other static or dynamic objects in the surroundings of the ego vehicle.

The driving situation can be predefined by a potential position of the ego vehicle and by surroundings parameters and object parameters of the road users and/or the other static or dynamic objects in the surroundings of the ego vehicle.

Therefore, in general, the present invention incorporates not only the surroundings of a vehicle, but also moving objects (automobiles, busses, trucks, persons, etc.) as mathematical "functions" into a mathematical environment.

The control unit according to example aspects the invention can be, for example, a control device (electronic control unit ECU or electronic control module ECM) or a processor.

In principle, any device that is capable of receiving electrical signals and processing the electrical signals on the basis of software or hardware is conceivable as a control unit. The surroundings sensors can be, for example, radar, LIDAR, camera, ultrasonic, or infrared sensors. The objects in the visual field of the surroudings sensors can be all objects, animals, and persons that a vehicle can hit in a driving situation, for example, pedestrians, cyclists, dogs, other automobiles, but also road signs, fences, walls, buildings, trash cans, etc.

The criticality is a quantitative unit of measure that allows for an assessment of how great the accident risk is at a certain location with all other road users. This location-dependent criticality can be entered into a criticality map and used, for example, for trajectory planning. This allows for trajectory planning that determines, under consideration of the entire detectable surroundings, that trajectory which has the lowest accident risk.

The challenge to be solved is that of depicting the vehicle in an "artificial" environment.

In one example embodiment of the invention, the function statement $$O_n(x, x_0) = \frac{1}{\tilde{M}_n} e^{-\frac{1}{2}\left(\sum_{i=1}^{3}\left(\frac{(x_i - x_{i,0})}{\sigma_i}\right)^2\right)}$$

is selected for an object function, with i=1, 2, 3; $\tilde{M}$ a normalizing constant; $\sigma=(\sigma_1, \sigma_2, \sigma_3)$ the standard deviation of the object function; and $x_0=(x_{1,0}, x_{2,0}, x_{3,0})$ the location of the object.

The object function can also be selected such that a different standard deviation $\sigma_v$ or $\sigma_h$ can be selected for the direction of travel (front) and the reverse direction (rear), respectively. For example, for forward travel, the standard deviation $\sigma_v$ can be selected in a parameter-dependent manner (depending on the driving parameters, such as velocity, etc.), while the standard deviation ah is selected to be constant (not parameter-dependent) (a predetermined fixed value, which corresponds, for example, to the dimensions of the vehicle). The standard deviation can also be selected depending on the angle between the travel direction vector v and the vector $x-x_0$, such that the standard deviation $\sigma$ changes continuously from $\sigma_v$ (front) to $\sigma_h$ (rear) depending on the angle.

The normalizing constant can be selected such that the value of the criticality is precisely one (1) in the case of an ego vehicle bumper at the edge of the object. The function statement selected here is a three-dimensional Gaussian distribution in Cartesian coordinates. The present invention is not limited to Cartesian coordinate systems, however. The utilized function statement has the property that the convolution of the utilized function statement is easily determined using a function of the same type, which drastically reduces the computing time of the criticality determination. Moreover, the convolution of two Gaussian functions is known in nearly all cases, which makes a fundamental determination of the criticality possible in the first place.

In one example embodiment of the invention, the Gaussian distribution is determined by a standard deviation $\sigma$, wherein the standard deviation a is a function of object parameters, for example, velocity or acceleration, and/or surroundings parameters, for example, ambient temperature, road condition.

The velocity of an object in the visual field can be determined, for example, by a Doppler effect evaluation of radar or LIDAR data. The acceleration of an object can be ascertained, for example, by intermittently considering the velocity of the object. The ambient temperature can be determined, for example, by a thermometer or temperature sensor. The road condition can be determined, for example, by a sound sensor. The visual range and the position of the sun, and further parameters, such as fog density, can be determined, for example, by evaluating camera data. Taking as many factors as possible, and, thus, different surroundings data, into account enables trajectory planning that is precise and, thereby, faultless and insusceptible to interference.

The control unit according to example aspects of the invention can be designed for ascertaining the standard deviation a on the basis of an estimated braking distance s of the object.

The identification of the standard deviation of the object function with the expected braking distance enables an identification of the object function having a danger zone around the object. This is advantageous for subsequent trajectory planning, which can then plan a trajectory around the braking distances of detected objects.

In one further example variant of the invention, the object function of the control unit is determined by a standard deviation $\sigma$, wherein the control unit is designed for determining the standard deviation with the aid of a polynomial model $$\sigma_i = \sum_{j=1}^{J} a_{i,j} \cdot v^j + c_{i,ext}$$

wherein v represents the object velocity, and wherein the individual parameters $a_j$ (acceleration) and $c_{ext}$ (surroundings parameter) are determined with the aid of a multivariate regression or with the aid of a neural network from a set of known braking distance data.

This has the advantage that the standard deviation of the object function can be determined individually for different driving situations (fog, slipperiness, wetness, . . . ) and different objects (static, fast, slow, . . . ). This permits the control unit according to example aspects of the invention to appropriately determine the criticality of a driving situation for very different weather and traffic conditions.

Moreover, the control unit can be configured for determining the criticality ($I_{cri}$) of a driving situation with the aid of the following formula $$I_{cri} = \frac{1}{N} \sum_{n=1}^{N} \int \int \int O_{ego} \cdot O_n dx\, dy\, dz$$

wherein n indicates the detected objects, N designates the total number of all detected objects, $O_{ego}$ represents the ego object function, and $O_n$ represents the object function of a detected object.

Instead of the sum of the criticalities across various objects, alternatively, the maximum of the overlapping variables $\iiint O_{ego} \cdot O_n$ dx dy dz can also be used as the criticality:

$$I_{cri} = \text{MaX}_{n=1 \ldots N}(\iiint O_{ego} \cdot O_n dx\, dy\, dz))$$

The calculation of the criticality as the sum of overlap integrals between the ego object function and object functions is suitable, since, as a result, the criticality describes an overlap of danger zones and, thereby, as a collision probability.

The criticality $I_{cri}$ can be normalized in such a way that, in the case that the ego vehicle contacts another object, the criticality is equal to one (1). The calibration of the criticality to the value one (1) for a bumper-to-bumper contact permits a calibration of the criticality. Moreover, setting the criticality to one (1) for the case of bumper-to-bumper contact allows the use of criticality values>1 for assessing an accident severity.

The determination of location-dependent criticality values and the representation of this determination in a criticality map allows for an assessment of how dangerous locations in the surroundings of the vehicle are for the vehicle. This enables trajectory planning that minimizes the accident risk during the planning.

The control unit can be configured for communicating with a vehicle via the Internet, wherein sensor data are received from the vehicle and criticalities are transmitted to the vehicle.

The control unit can be installed in a vehicle that includes surroundings sensors. The vehicle can be configured such that the control unit communicates with the surroundings sensors, transmits sensor data of the surroundings sensors to the control unit, and receives criticalities from the control unit.

Such a vehicle according to example aspects of the invention is, as described above, capable of quantitatively assessing the hazardous situation with respect to the current driving and traffic situation of the vehicle.

BRIEF DESCRIPTION OF THE DRAWINGS

Example aspects of the invention are explained by way of example in the following with reference to the embodiments shown in the figures, wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
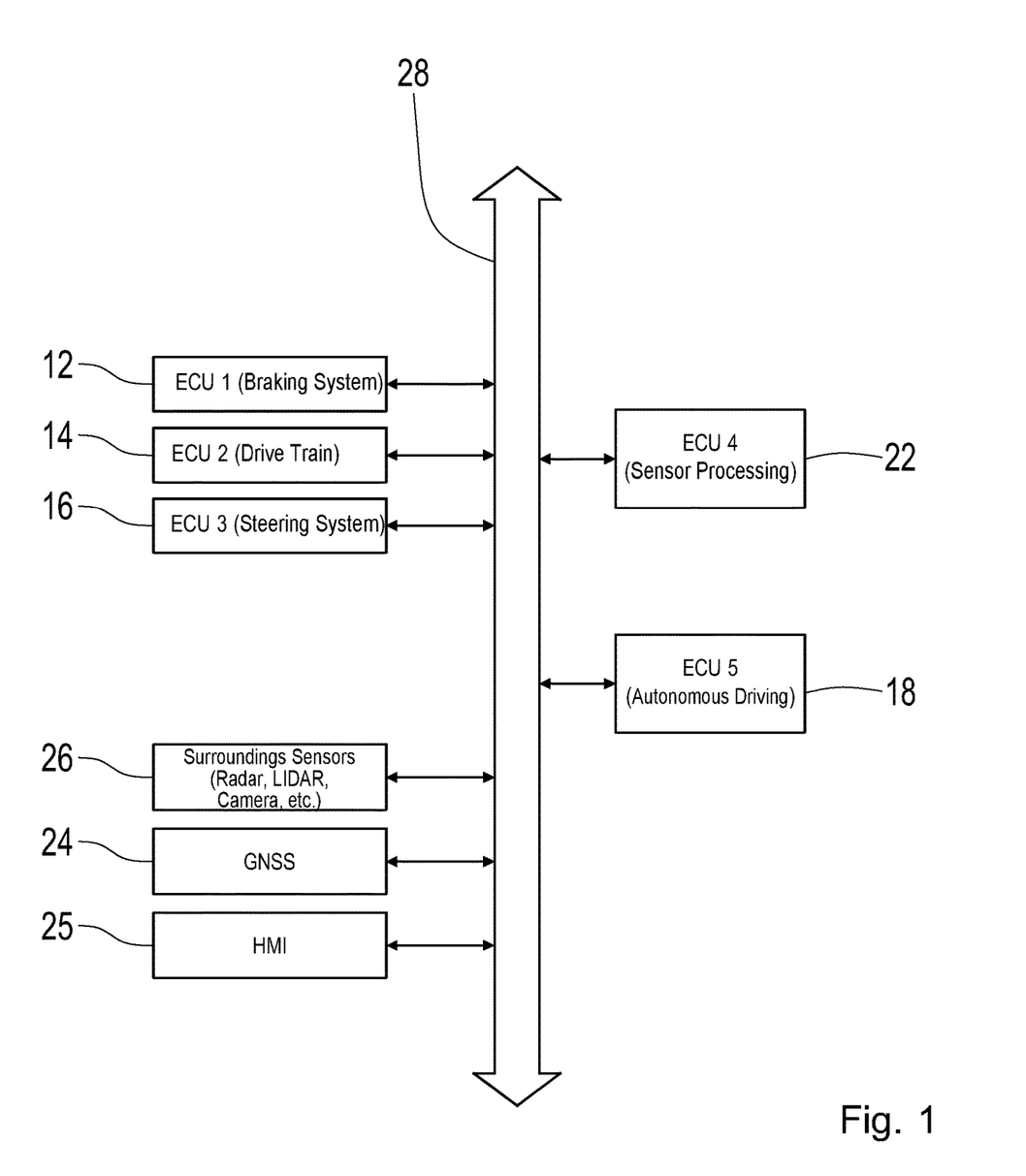
FIG. 1 shows a block diagram, which schematically shows the configuration of a vehicle 10 according to one exemplary embodiment of the present invention.

FIG. 1 shows a block diagram, which schematically shows the configuration of a vehicle 10 according to one exemplary embodiment of the present invention. The vehicle 10 includes multiple electronic components, which are connected to one another via a vehicle communication network 28. The vehicle communication network 28 can be, for example, a standard vehicle communication network installed in the vehicle, such as, for example, a CAN bus (Controller Area Network), a LIN bus (Local Interconnect Network), a LAN bus (Local Area Network), a MOST bus, and/or a FlexRay bus, or the like.

In the example shown in FIG. 1, the vehicle 10 includes a control unit 12 (ECU 1) for a braking system. The braking system refers to the components configured for braking of the vehicle. The vehicle 10 also includes a control unit 14 (ECU 2), which controls a drive train by way of an open-loop system. The drive train refers to the drive components of the vehicle. The drive train can include an engine, a transmission, a drive/propeller shaft, a differential, and an axle drive. The vehicle 10 also includes a control unit 16 (ECU 3), which controls a steering system by way of an open-loop system. The steering system refers to the components configured for directional control of the vehicle.

Moreover, the control units 12, 14, 16, 18, and 22 can receive vehicle operating parameters from the above-described vehicle sub-systems, the vehicle sub-systems detecting the vehicle operating parameters by one or multiple vehicle sensor(s). Vehicle sensors are preferably those which detect a state of the vehicle or a state of vehicle parts, in particular the movement state of the vehicle or of the vehicle parts. The sensors can be a ground speed sensor, a yaw rate sensor, an acceleration sensor, a steering wheel angle sensor, a vehicle load sensor, temperature sensors, pressure sensors, and the like. For example, sensors can also be arranged along the brake line in order to output signals that indicate the brake fluid pressure at various points along the hydraulic brake line. Other sensors can be provided in the proximity of the wheel, which detect the wheel speed and the brake pressure that is applied at the wheel.

The vehicle sensor system of the vehicle 10 also includes a satellite navigation unit 24 (GNSS unit). It is pointed out that, in the context of the present invention, GNSS is representative of all global navigation satellite systems (GNSS), such as, for example, GPS, AGPS, Galileo, GLONASS (Russia), Compass (China), IRNSS (India), and the like.

The vehicle 10 also includes one or multiple sensor(s) that are designed for detecting the surroundings of the vehicle. The sensors are mounted at the vehicle and capture images of the surroundings of the vehicle or detect objects or conditions in the surroundings of the vehicle. The surroundings sensors 26 include, in particular, cameras, radar sensors, LIDAR sensors, ultrasonic sensors, or the like. The surroundings sensors 26 can be arranged within the vehicle or outside the vehicle (for example, on the outer side of the vehicle). For example, a camera can be provided in a front area of the vehicle 10 for capturing images of an area located ahead of the vehicle.

The vehicle 10 also includes a sensor processing unit 22 (ECU 4), which is capable of determining a grid map with occupancy probabilities on the basis of sensor data, which are provided by the surroundings sensors 26 in the form of a point cloud. The sensor processing unit 22 (ECU 4) can also be configured for assessing the criticality of a driving situation (see description of FIG. 5) based on the processing sensor cards. The determination of the criticality can also be outsourced to a separate control unit, if necessary.

The vehicle 10 also includes a control unit for autonomous driving 18 (ECU 5). The control unit for autonomous driving 18 is designed for controlling the vehicle 10, by way of an open-loop system, in such a way that the vehicle 10 can act in traffic entirely or partially without influence of a human driver. When an operating state for the autonomous driving is activated on the control side or by the driver, the control unit for autonomous driving 18 determines—on the basis of available data across a predefined route, surroundings data acquired by the surroundings sensors 26 and/or processed data provided by the sensor processing unit 22, and on the basis of vehicle operating parameters detected by the vehicle sensors, the vehicle operating parameters being transmitted from the control units 12, 14, and 16 to the control unit 18—parameters for the autonomous operation of the vehicle (for example, target velocity, target torque, distance from the preceding vehicle, distance to the roadway edge, steering operation, and the like).

The vehicle 10 also includes a user interface 25 (HMI=Human-Machine Interface), which is configured to allow a vehicle occupant to interact with one or multiple vehicle system(s). This user interface 25 (for example, a GUI=Graphical User Interface) can include an electronic display for outputting a graphical display of icons and/or content in text form, and an input interface for receiving an input (for example, manual input, voice input, and input of gestures, head or eye movements). The input interface can include, for example, keypads, switches, touch screens, eye trackers, and the like.

Figure 2A:
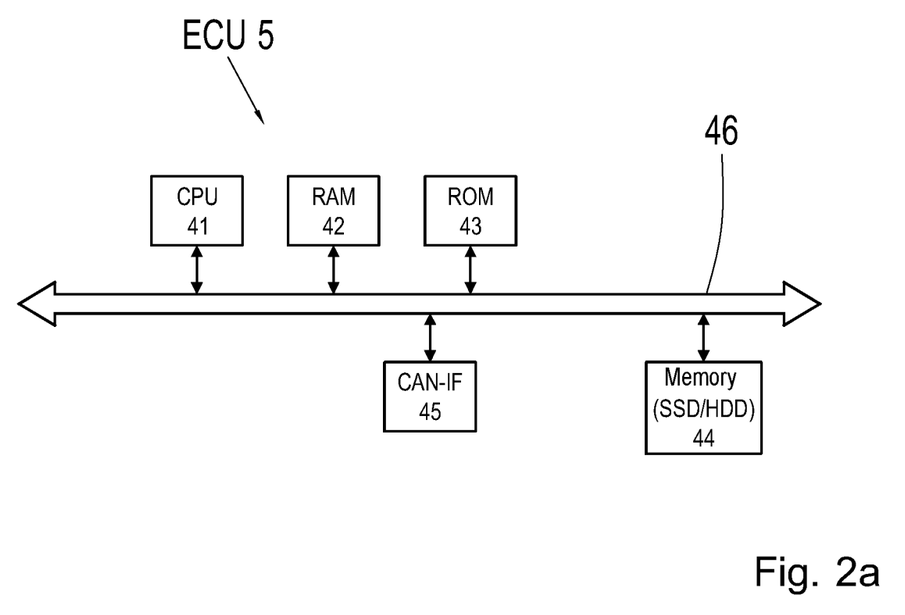
FIGS. 2a, b schematically show an exemplary configuration of a control unit for autonomous driving.

FIG. 2*a* shows a block diagram, which represents an exemplary configuration of a control unit for autonomous driving 18 (ECU 5). The control unit for autonomous driving 18 can be, for example, a control device (electronic control unit ECU or electronic control module ECM). The control unit for autonomous driving 18 includes a processor 41. The processor 41 can be, for example, a processing unit, such as a central processing unit (CPU=Central Processing Unit), which carries out program instructions. The processor of the control unit for autonomous driving 18 is designed, for example, for calculating—during driving and depending on the planned driving maneuver, based on the information of the sensor-based surroundings model—an optimal driving position (for example, a following distance or a lateral offset with respect to a preceding vehicle, or the like) under consideration of the permissible navigable lane area. The computed optimal driving position is used for the open-loop control of the vehicle sub-systems 12, 14, and 16, for example, of braking actuators, drive actuators, and/or steering actuators. The control unit for autonomous driving 18 also includes a memory and an input/output interface. The memory can be made up of one or multiple non-volatile computer-readable medium/media and includes at least one program memory area and one data memory area. The program memory area and the data memory area can include combinations of various types of memories, for example, a read-only memory 43 (ROM=Read-Only Memory) and a random access memory 42 (RAM=Random Access Memory) (for example, dynamic RAM ("DRAM"), synchronous DRAM ("SDRAM"), etc.). Moreover, the control unit for autonomous driving 18 can include an external storage drive 44, such as, for example, an external hard disk drive (HDD), a flash memory drive, or a non-volatile solid state drive (SSD). The control unit for autonomous driving 18 also includes a communication interface 45, via which the control unit can communicate with the vehicle communication network (46 in FIG. 2).

Figure 2B:
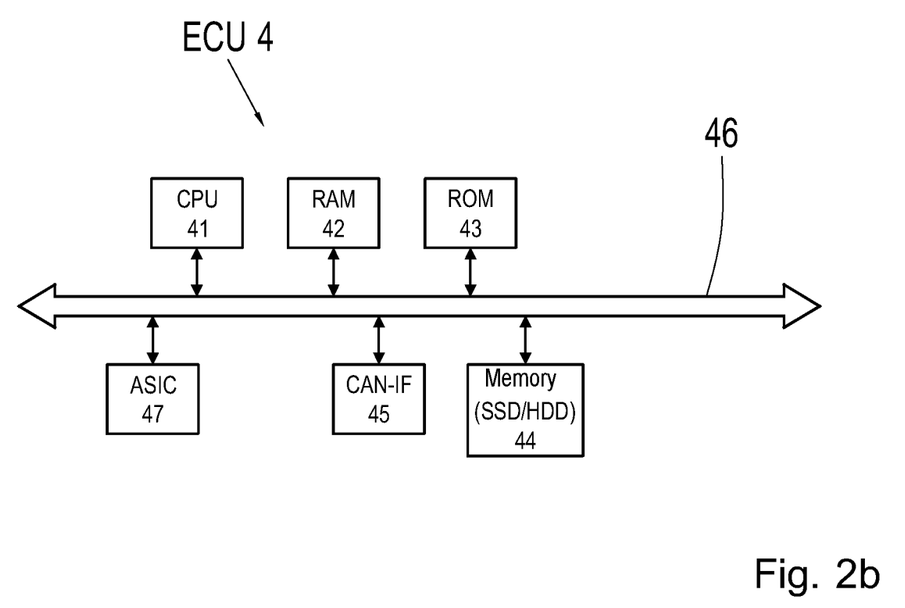

FIG. 2*b* schematically shows a sensor processing unit 22 according to example aspects of the invention. All components of the sensor processing unit 22 are connected via an internal communication network 46. The sensor processing unit 22 includes an application-specific integrated circuit 47 (ASIC or also FPGA). The integrated circuit 47 can be, for example, a GPU or a GPU cluster. The integrated circuit 47 is configured in such a way that the integrated circuit 47 transfers sensor data in the form of a point cloud into an occupancy grid map for the visual field of the sensor. The sensor processing unit 22 includes a processor 41. The processor 41 can be, for example, a processing unit, such as a central processing unit (CPU=Central Processing Unit), which carries out program instructions in order, for example, to prepare information for processing by the integrated circuit 47. The sensor processing unit 22 also includes a memory and an input/output interface. The memory can be made up of one or multiple non-volatile computer-readable medium/media and includes at least one program memory area and one data memory area. The program memory area and the data memory area can include combinations of various types of memories, for example, a read-only memory 43 (ROM=Read-Only Memory) and a random access memory 42 (RAM=Random Access Memory) (for example, dynamic RAM ("DRAM"), synchronous DRAM ("SDRAM"), etc.). Moreover, the sensor processing unit 22 can include an external storage drive 44, such as, for example, an external hard disk drive (HDD), a flash memory drive, or a non-volatile solid state drive (SSD). The sensor processing unit 22 also includes a communication interface 45, via which the control unit can communicate with the vehicle communication network (46 in FIG. 2).

Figure 3:
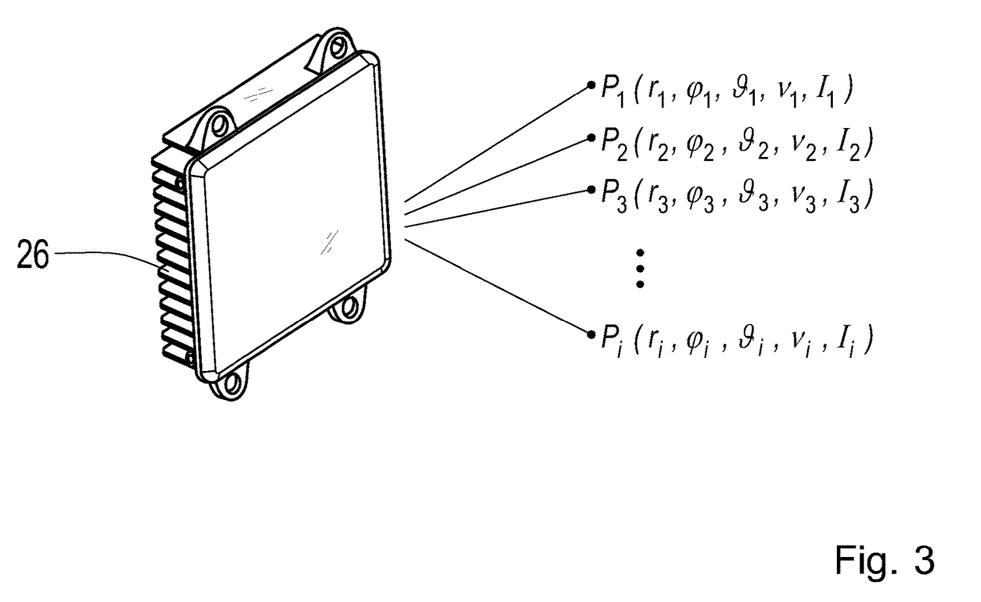
FIG. 3 shows an exemplary surroundings sensor 26, in particular a radar sensor.

FIG. 3 shows an exemplary surroundings sensor 26, in particular a radar sensor in this case. The radar sensor 26 is a detection and locating device based on electromagnetic waves in the radio frequency range. The radar sensor transmits a signal as a bundled electromagnetic wave (primary signal) and receives the echos reflected by objects (secondary signal). By information obtained in this way, such as, for example, propagation time differences, information is gained regarding detection events ("target points") $P_1(r_1, \varphi_1, \theta_1, v_1, I_1)$, $P_2(r_2, \varphi_2, \theta_2, v_2, I_2)$, $P_3(r_3, \varphi_3, \theta_3, v_3, I_3)$, . . . , $P_i(r_i, \varphi_i, \theta_i, v_i, I_i)$ such as, for example, azimuth angle $\varphi_i$ and elevation angle $\theta_i$, which describe the direction to the target point, the distance $r_i$ to the target point, the radial velocity $v_i$, and the lateral velocity $I_i$, which describe the relative motion between the radar sensor 26 and the target point $P_i$. The relative motion can be calculated, for example, due to the Doppler effect, from the displacement of the frequency of the reflected signal. If necessary, the distance and the absolute velocity of a target point $P_i$ can be ascertained by lining up individual measurements. Due to the fact that a large amount of target points $P_i$ (referred to as "point cloud") is evaluated in its entirety, target points $P_i$ can be identified as belonging to an unambiguous object (clustering method), contours of objects can be recognized, and images of the objects can be obtained provided the resolution of the radar sensor 26 is sufficient.

Figure 4A:
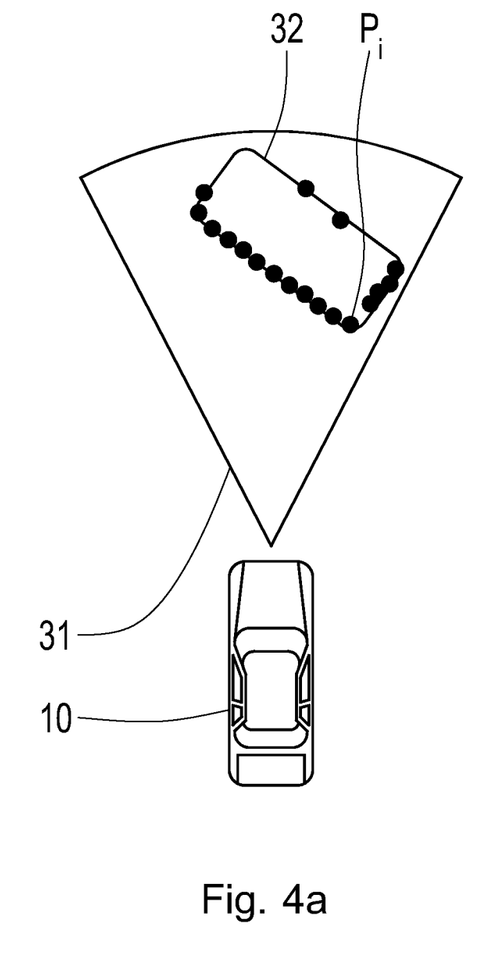
FIGS. 4a, b, c show the acquisition of a two-dimensional grid map from detection events of a radar sensor.
Figure 4B:
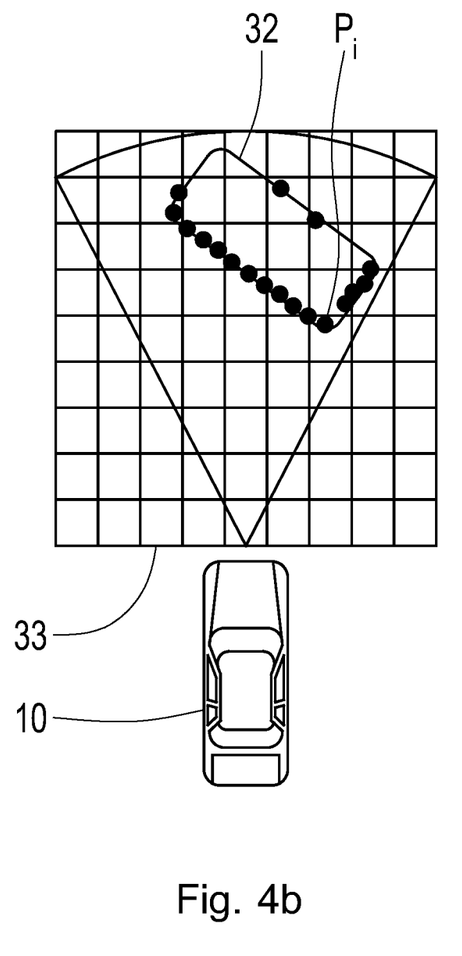
Figure 4C:
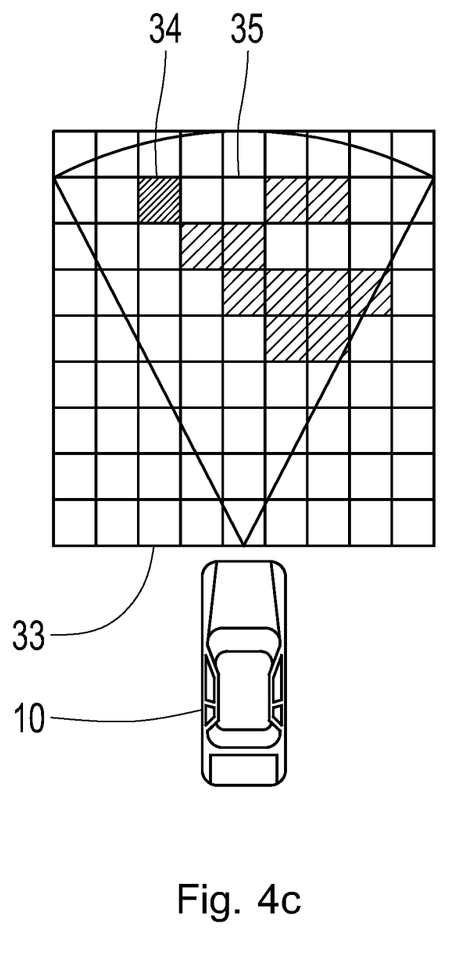

FIGS. 4*a, b, c* show the acquisition of a two-dimensional grid map from detection events of a radar sensor. In FIG. 4*a*, a viewing range 31 of a radar sensor is ahead of the vehicle 10 on which the radar sensor is installed. An object 32 is located in the viewing range 31 of the radar sensor. The radar waves reflected at the object 32 generate detection events in the radar sensor, the radar sensor outputting detection events in the form of target points Pdi. The entirety of the detection events detected in this way is present in the form of a point cloud, which can be evaluated in an evaluation unit of the sensor (or also externally). FIG. 4*b* shows a two-dimensional grid map 33 (also referred to as "grid"), which is designed such that the two-dimensional grid map 33 subdivides the viewing range 31 of the radar sensor into cells in a Cartesian manner. Due to the transformation of the position coordinates, which is known to a person skilled in the art, from the polar coordinate system of the radar sensor into the Cartesian coordinate system of the grid map 33, each target point $P_i$ can be unambiguously assigned to a cell of the grid map. In FIG. 4c, those cells in which at least one target point $P_i$ is contained, are shaded, whereas those cells to which no target points $P_i$ can be assigned, are not shaded.

All sensor data, mainly point clouds, are entered into such a grid map. The detection events and information from multiple surroundings sensors derived from the detection events can be arranged into such a grid map by known techniques of sensor fusion. These can also be the detection events of sensors of different sensor types, for example, radar sensors, LIDAR sensors, ultrasonic sensors, or the like. If the sensors are distributed around the vehicle, such a grid map can depict the surroundings all around the vehicle.

The static surroundings of the vehicle 10 can be detected by distinguishing static and dynamic targets. This enables an object detection and a determination of object parameters, such as the velocity of the object v, the extent of the object R_i in the three spatial dimensions, or an acceleration of the object a for the objects detected in this way. The detected objects and the object parameters ascertained for these objects can be stored in the grid map and/or on an external memory.

In this way, and/or by using information regarding the inherent movement of the vehicle 10 (also referred to as "ego movement"), such as, for example, the vehicle speed and the vehicle position (see GNSS 24 in FIG. 1), the information in the grid map 33 from FIGS. 4a, b, c can be entered into an accumulated grid map. The vehicle 10 moves on this accumulated grid map and the new position of the vehicle 10 is continuously recalculated. The sensor data are entered into the accumulated grid map in each measuring cycle with a compensated vehicle position. With this approach, sensor data can be accumulated over time and detected and evaluated in a static manner (with respect to a "global" coordinate system).

In the sensor processing unit 22 (ECU 4 from FIG. 1), an object detection is initially carried out based on the detected point clouds, according to techniques that are known to a person skilled in the art, in order to detect all moving and stationary objects in the visual field of the sensors, and their locations $x_{i,0}$, extents $R_i$, and velocities $v_i$. Various approaches known to a person skilled in the art can be used for this object detection, for example, methods for edge detection, transformations, or size and color recognition. It is also possible to use artificial neural networks for the object detection.

According to example aspects of the invention, such objects detected via the sensor processing are described with the aid of object functions, which define a danger zone for the object. According to one exemplary embodiment, in order to describe a moving object, in particular, a function statement for an object function $O(x, x_0)$ is selected, in which the object function $O(x, x_0)$ is defined by a Gaussian function having a given standard deviation $\sigma=(\sigma_1, \sigma_2, \sigma_3)$, which describes the "width" of the danger zone around the object:

$$O(x, x_0) = \frac{1}{\tilde{M}_n} e^{-\frac{1}{2}\left(\sum_{i=1}^{3}\left(\frac{(x_i - x_{i,0})}{\sigma_i}\right)^2\right)}$$

wherein $x=(x_1, x_2, x_3)$ describes any location as a position vector in three-dimensional space and $x_0=(x_{1,0}, x_{2,0}, x_{3,0})$ describes the current position as a position vector of the object in three-dimensional space. Moreover, M represents a normalizing constant, which is described in greater detail below. The object function $O(x, x_0)$ assigns an "accident potential" or a hazard potential $O(x, x_0)$ to a position x.

Figure 5:
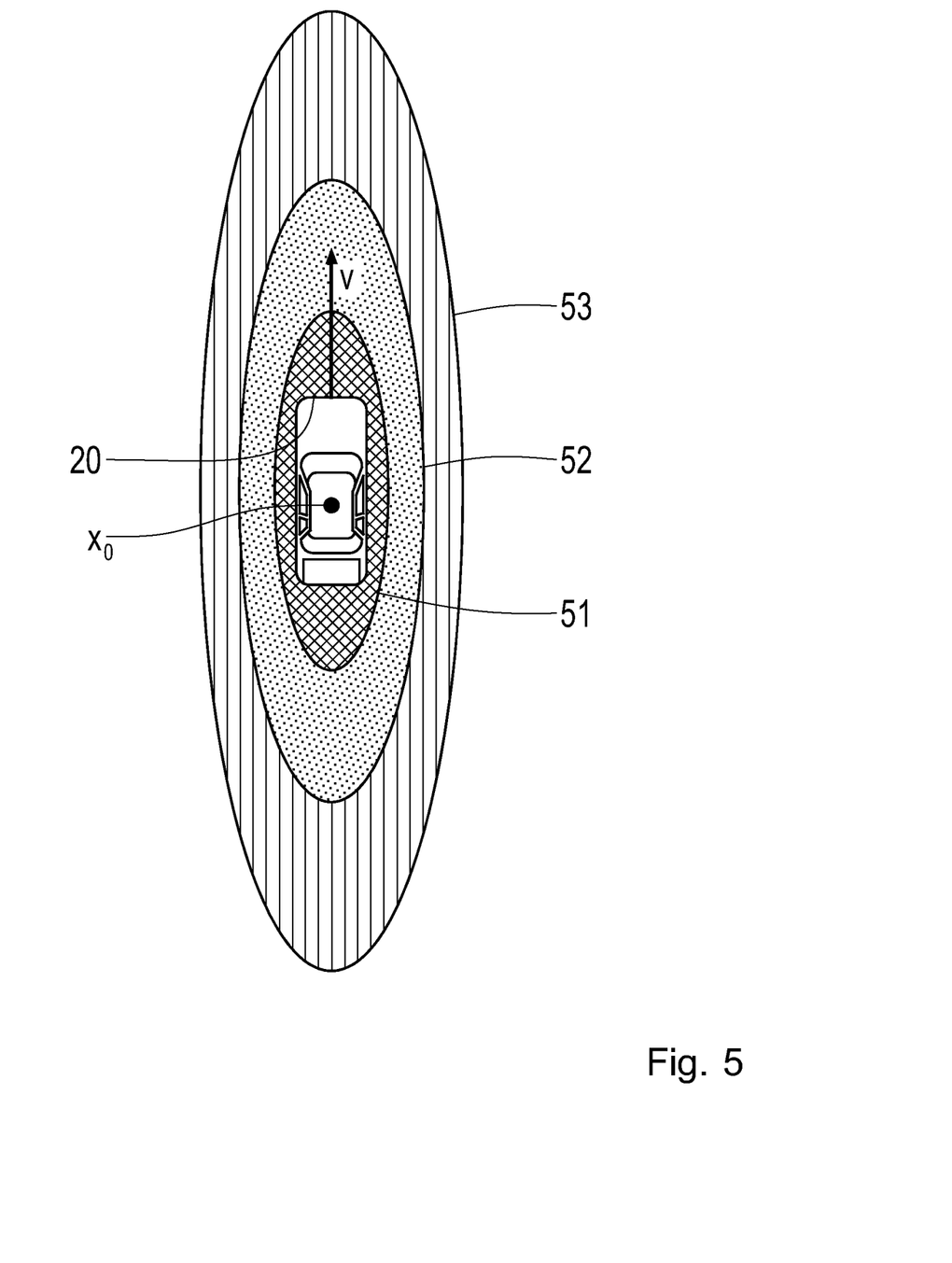
FIG. 5 shows a contour plot of an exemplary object function, which is defined by a Gaussian function having a given standard deviation.

FIG. 5 shows a contour plot of an exemplary object function, which is defined by a Gaussian function having a given standard deviation. An object vehicle 20 is shown, the danger zone of which is described by the object function $O(x_i, x_{i,0})$. The object function $O(x_i, x_{i,0})$ follows a Gaussian function, the center of which is located at the current position $x_{i,0}$ of the object vehicle 20. The ellipses correspond to contour lines 51, 52, 53 of the object function $O(x_i, x_{i,0})$. In the cross-hatch-shaded area within the first contour line 51, the object function $O(x_i, x_{i,0})$ has a high value (i.e., the risk posed by the object is high). In the dotted area between the first contour line 51 and the second contour line 52, the object function $O(x_i, x_{i,0})$ has a lower value than in the cross-hatch-shaded area. In this area, the distance from the current position of the vehicle is greater, and so the risk posed by the object is less than in the crossed-shaded area. In the shaded area between the second contour line 52 and the third contour line 53, the object function $O(x_i, x_{i,0})$ has an even lower value than in the dotted area, i.e., the risk posed by the object is even lower. Outside the contour line 53, i.e., at even greater distances from the current position of the object vehicle 20, the risk posed by the object approaches zero. The second contour line 52 corresponds to a distance from the position of the vehicle that corresponds to the standard deviation in the particular spatial direction. $\sigma_1$ corresponds to the standard deviation in the forward direction. $\sigma_2$ corresponds to the standard deviation perpendicular to the direction of travel. The object vehicle 20 moves at a velocity v in the forward direction. Therefore, the standard deviation in the forward direction $\sigma_1$ is greater than the standard deviation perpendicular to the direction of travel $\sigma_2$.

The object function $O(x_i, x_{i,0})$ can be used within the scope of trajectory planning for a criticality determination, as described in greater detail below with reference to FIG. 6. The standard deviation $\sigma_i$ of an object has the significance of a safety distance, which is to be maintained with respect to the object in order to avoid critical situations up to a collision.

The Gaussian-based object function for the object vehicle 20 in this case is symmetrical along the spatial axes. For example, the object function $O(x_i, x_{i,0})$ from FIG. 5 is symmetrical in the direction of travel (forward direction) and in the reverse direction.

The object function can also be selected such that a different standard deviation $\sigma_v$ or $\sigma_h$ can be selected for the direction of travel (front) and the reverse direction (rear), respectively. For example, for forward travel, the standard deviation $\sigma_v$ can be selected in a parameter-dependent manner (depending on the driving parameters, such as velocity, etc.), while the standard deviation ah is selected to be constant (not parameter-dependent) (a predetermined fixed value, which corresponds, for example, to the dimensions of the vehicle). The standard deviation can also be selected depending on the angle between the travel direction vector v and the vector $x-x_0$, such that the standard deviation a changes continuously from $\sigma_v$ (front) to $\sigma_h$ (rear) depending on the angle.

Provided that the object vehicle 20 is located ahead of an ego vehicle, which is configured, according to example aspects of the invention, for determining the criticality of a driving situation by the described object function, the ego vehicle should maintain the same safety distance to the object vehicle 20 as when the ego vehicle travels ahead of the object vehicle 20. In the case that the ego vehicle is traveling behind the object vehicle 20, the ego vehicle should maintain a distance that is at least the braking distance of the object vehicle 20, so that the ego vehicle can still apply the brakes if the object vehicle 20 applies the brakes. In the case that the ego vehicle is traveling ahead of the object vehicle 20, the ego vehicle 10 should also at least maintain the braking distance of the object vehicle, so that the object vehicle can still apply the brakes when the ego vehicle applies the brakes ahead of the object vehicle.

Generally, the standard deviation $\sigma_i$, which indicates the size of the danger zone around the object, is selected, in particular, as a function of one or multiple object or surroundings parameter(s). For example, the standard deviation $\sigma_i$ can be selected as a function of the object velocities $v_i$, the object accelerations $a_i$, the object extents $R_i$, or as a function of weather conditions, such as, for example, the visual range Sw, the position of the sun Ss, or the like:

$$\sigma_i = f(v_i, a_i, R_i, Sw, Ss, \ldots)$$

As described above, the standard deviation $\sigma_i$ of an object has the significance of a safety distance to the object, which is to be maintained in order to avoid critical situations up to a collision. According to one exemplary embodiment of the invention, the standard deviation $\sigma_i$ for describing the danger zone of an object is set, for example, to be equal to the estimated braking distance s. If one finds him/herself within the danger zone, it cannot be guaranteed that damage can be avoided despite a brake application by the object. The standard deviation a is calculated according to this exemplary embodiment as:

$$\sigma = \sigma_v = s(v) = a \cdot v^2 + b \cdot v$$

wherein v is the velocity of the object. The quadratic dependence $a \cdot v^2$ between the braking distance s and the velocity v, which is known to a person skilled in the art, is applied in this case. To generalize, the model of this exemplary embodiment also includes a linear term $b \cdot v$. The constants a and b are model parameters, which must first be determined.

In one exemplary embodiment of the present invention, the model parameters based on the current retrieved object- and surroundings parameters are read out of a look-up table, which was previously stored on the control unit (22 in FIG. 1) according to example aspects of the invention. In one further exemplary embodiment of the present invention, the model parameters are determined by multivariate regression from data sets previously stored on the control unit according to example aspects of the invention (22 in FIG. 1). These data sets contain values for model parameters at different object or surroundings parameters. In one further exemplary embodiment of the present invention, such data sets are used to train an artificial neural network. In this case, the control unit according to example aspects of the invention (22 in FIG. 1) also includes this artificial neural network, which determines the model parameters based on the object and/or surroundings parameters. In this way, it is possible, for example, to determine the parameters a and b as a function of surroundings parameters, such as atmospheric humidity, temperature, fog density, etc., or object parameters, such as object outline or acceleration.

According to one further exemplary embodiment, in addition to the estimated braking distance, an extended braking distance due to poor visibility and, thereby, poor response conditions can be modeled:

$$\sigma = \sigma_v + \sigma_{Nebel} = a \cdot v^2 + b \cdot v + c_{Nebel}$$

wherein the parameter $c_{Nebel}$ models the visibility Sw.

The parameter $c_{Nebel}$ can be selected, for example, as follows:

$$c_{Nebel} = \begin{cases} 0 \text{ m no fog} \\ 10 \text{ m faint fog} \\ 100 \text{ m heavy fog} \end{cases}$$

wherein, for the visibility Sw, a distinction is made between the three fog densities no fog, light fog, and heavy fog. In heavy fog, the standard deviation is greatly increased, since the braking distance of the object and, therefore, the required safety distance from the object is high. With no fog, the value $c_{Nebel}$ corresponds to the dimensions of the object with respect to magnitude.

Moreover, the dimensions $R_i$ of the vehicle can also be incorporated into the determination of the standard deviation, in this case, for example, the dimensions $c_R = \frac{1}{2} R_1$ of the vehicle in the direction of travel:

$$\sigma = \sigma_v + \sigma_{Nebel} + \sigma_{TR} = a \cdot v^2 + b \cdot v + c_{Nebel} + c_R$$

wherein the contribution $c_R$ of the vehicle dimension for a passenger car can be assumed to be, for example, $c_R = 0.5$ m.

It is to be noted here that a higher polynomial of the object velocity v can also be set for the braking distance, such that the following applies for the three spatial dimensions $$\sigma_i = \sum_{j=1}^{J} a_{i,j} \cdot v^j + c_{i,ext}$$

with $J \in \mathbb{N}$. In this case, the individual parameters $a_j$, as mentioned above, can be determined with the aid of multivariate regression or with the aid of a neural network for a current situation specifically from a set of known braking distance data. The constant value $c_{ext}$ can model external influences such as fog or darkness, as in the example presented above. This constant value $c_{ext}$ can obtained from already known braking value data also with the aid of multivariate regression or with the aid of a neural network, or can be obtained from a database, or can be set to a fixed value by the manufacturer.

The standard deviation $\sigma_i$ is a measure of the extent of the danger zone around the object (for example, vehicle). An object that does not move (object velocities $v_i = 0$) poses a low risk, since the danger zone is given essentially by the extent $R_i$ of the object. The danger zone can therefore be classified with a small standard deviation, which is given by the contribution $c_R$ of the vehicle dimension. Due to the braking distance associated with the velocity, a rapidly moving object has a larger danger zone and is associated with a greater standard deviation $\sigma_v$ than a slowly moving object.

Dangerous weather conditions, such as dampness (measurable, for example, with a hygrometer), ice on the roadway (at temperatures $T < 4°$ C., measurable with a thermometer or temperature sensor), various road conditions (measurable with an acoustic sensor), or fog (fog density determinable from camera images), during which a greater safety distance is appropriate, can then be incorporated into the criticality determination and, thus, into the trajectory planning, by using a model that depicts the standard deviation $\sigma_i$ of an object as a function of all these factors.

In this case, the trajectory planning can be carried out such that the planned trajectory of the ego vehicle extends outside the danger zone of the moving object to the greatest extent possible, as described in the following.

A danger zone around the ego vehicle as well as around all other road users detected by the sensor system can be determined on the basis of the above-described object function. In order to be able to determine a criticality, i.e., an assessment of how "critical" a traffic situation is for the ego vehicle, during autonomous driving, a quantitative description of the location-specific criticality $I_{cri}$ can be introduced on the basis of the above-described object functions $O_{ego}$ of the ego vehicle, and on the basis of the object functions $O_n$ of the other road users. In the present method according to example aspects of the invention, the criticality $I_{cri}$ is calculated as a sum of overlap integrals of the ego object function $O_{ego}$ and the particular object function O of the other road users:

$$I_{cri} = \frac{1}{N} \sum_{n=1}^{N} \iiint O_{ego} \cdot O_n dx\, dy\, dz$$

and $$I_{cri}(x_{ego,0}, x_{1,0}, \ldots, x_{N,0}) = \sum_{n=1}^{N} \frac{1}{N} \iiint O_{ego}(x, x_{ego,0}) \cdot O_n(x, x_{n,0}) dx$$

Here, $x_{ego,0}$ is the position of the ego vehicle, $x_{n,0}$ with $n=1 \ldots N$ being the particular positions of the other detected road users, and N is the number of these road users.

$I_{cri}$ can be considered as a "convolution" of the accident potentials of the ego vehicle and other road users and describes the accident probability per direction and time. The criticality per time is the maximum of the accident probability at the given point in time and the criticality per scenario is the maximum of the criticality over time.

This criticality $I_{cri}$ is normalized such that, in the case of ego bumper to foe bumper, $I_{cri}=1$. Provided that an accident is not present (ego and foe are separated from each other by further than bumper-to-bumper), the value range of this criticality $I_{cri}$ is between $\{I_{cri} \varepsilon R | 0 \leq I_{cri} \leq 1\}$ For the value range $\{I_{cri} \varepsilon R | 1 \leq I_{cri}\}$, a crash/accident is present. In this case, the value of the criticality $I_{cri} > 1$ can be used for assessing the "crash" severity and for a risk analysis.

Assuming that $x_{ego,0}$ is the current position of the ego vehicle, the criticality $I_{cri}(x_{ego,0}, x_{1,0}, \ldots, x_{N,0})$ assesses the present driving situation with respect to an accident risk, which is produced by the hazard potential of the individual road users. If, rather than the present ego position $x_{ego,0}$, any position x is used as a potential ego position, a criticality map can be created, which assigns a criticality $I_{cri}(x, x_{1,0}, x_{N,0})$ and/or an accident risk to any position x (potential ego position).

The advantage of this criticality determination is that it takes a separate hazard potential or accident potential into account for each road user by the particular object function $O_{ego}$ or $O_n$.

The criticality map $I_{cri}(x, x_{1,0}, \ldots, x_{N,0})$ can be used within the scope of trajectory planning ("motion planning") for a criticality determination, in particular for defining minimum-risk manuevers. Via the standard deviations, the criticality $I_{cri}$ depends on object parameters (location $x_i$, velocity $v_i$, and acceleration of the ego vehicle and other road users), and on surroundings parameters (temperature, humidity, road condition, and the like).

Even though only the object functions of other detected road users have been taken into account in the above-described exemplary embodiment, object functions of further objects, such as, for example, static objects such as buildings, trees, traffic signs, or the like, can also be incorporated in alternative embodiments.

Figure 6:
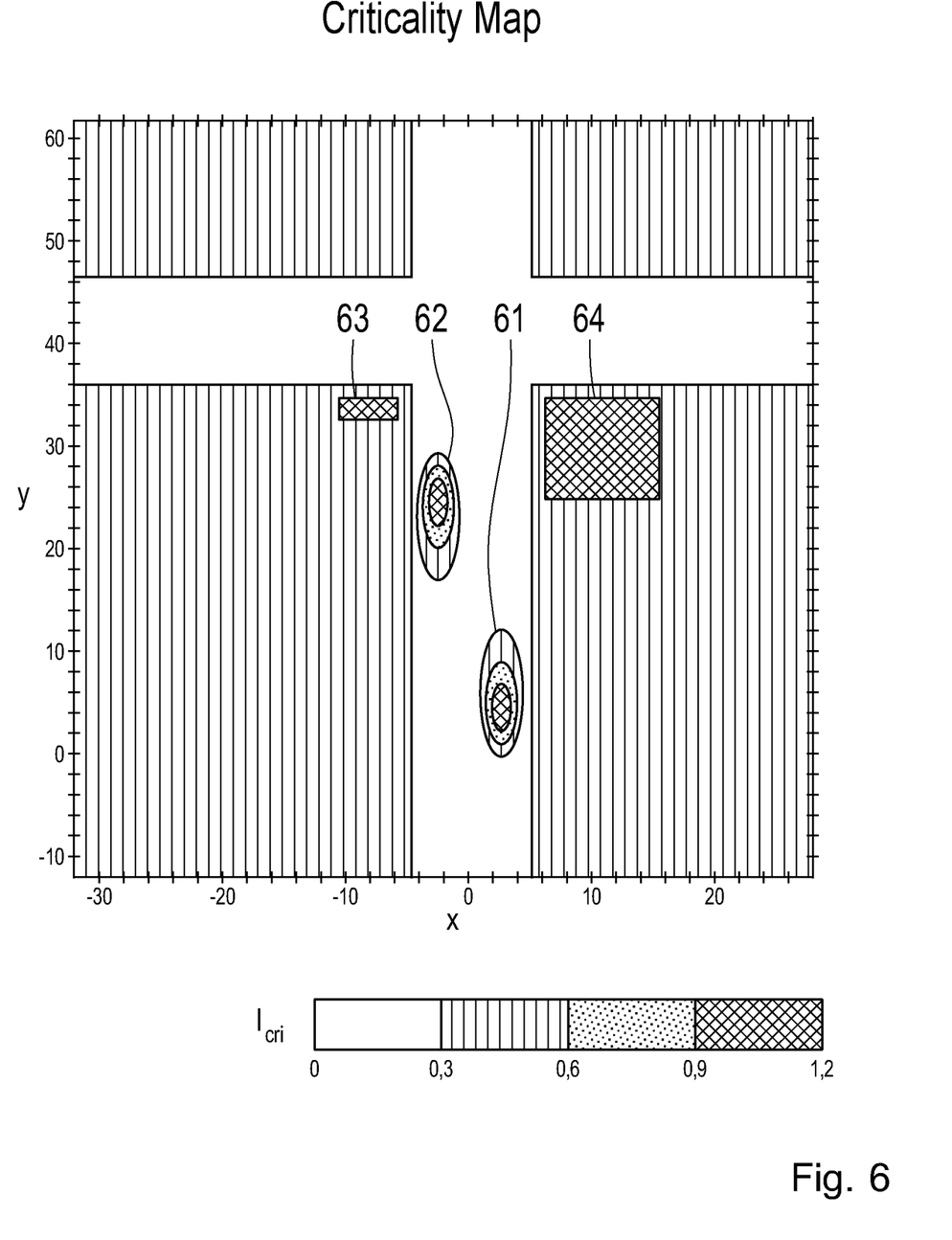
FIG. 6 shows, for example, a criticality map of the type that can be the result of a method according to example aspects of the invention.

FIG. 6 shows, for example, a two-dimensional criticality map, of the type obtained by the above-described "convolution" of potential hazards. The two-dimensional criticality map presented shows a density and contour plot of the criticality $I_{cI_{cri}(x,y)ri}(x,y)$ for potential positions $x=(x_1, x_2) = (x, y)$ of the ego vehicle. The criticality $I_{cri}(x,y)$ is displayed here in four stages: <0.3% (white), 0.3-0.6% (dashed), 0.6-0.9% (dotted) and >0.9% (cross-hatched). The density and contour plot shows two dynamic objects 61 and 62, which are vehicles of other road users. Moreover, the density and contour plot shows static objects, in this case, in particular, two buildings 63 and 64. A road meets a second road at an intersection and then continues. The criticality $I_{cri}(x, y)$ for potential ego positions (x, y) having a sufficient distance to the vehicles 61 and 62 is low, while the criticality $I_{cri}(x, y)$ is elevated for positions in the danger zone of the vehicles 61 and 62. The criticality $I_{cri}(x, y)$ for potential ego positions (x, y) that are located "within" the extents of one of the vehicles 61, 62 exceeds the value one (1), since a case of the ego vehicle remaining at these locations would necessarily imply an accident. Similarly, the criticality $I_{cri}(x, y)$ for potential ego positions (x, y) that are located "within" the extents of the buildings 63, 64, exceeds the value one (1), since a case of the ego vehicle remaining at these locations would also imply an accident.

The ascertained criticality map, then, can be transferred to a control device for autonomous driving (18 in FIG. 1) for trajectory planning, in order to determine a safe route for the vehicle 10. Together with the static description of the surroundings and the criticality $I_{cri}$, trajectory planning can then be carried out with the aid of the regulating technique. The trajectory planning should always avoid locations that present an accident risk according to the criticality map. The criticality map can be adapted, in time steps, to changing object parameters and surroundings parameters.

In one exemplary embodiment of the present invention, in which sensor data are stored in a grid map (see FIGS. 4a, 4b, and 4c), the criticality $I_{cri}$ is determined for each grid cell of the grid map and stored in this grid cell as an additional value.

Figure 7:
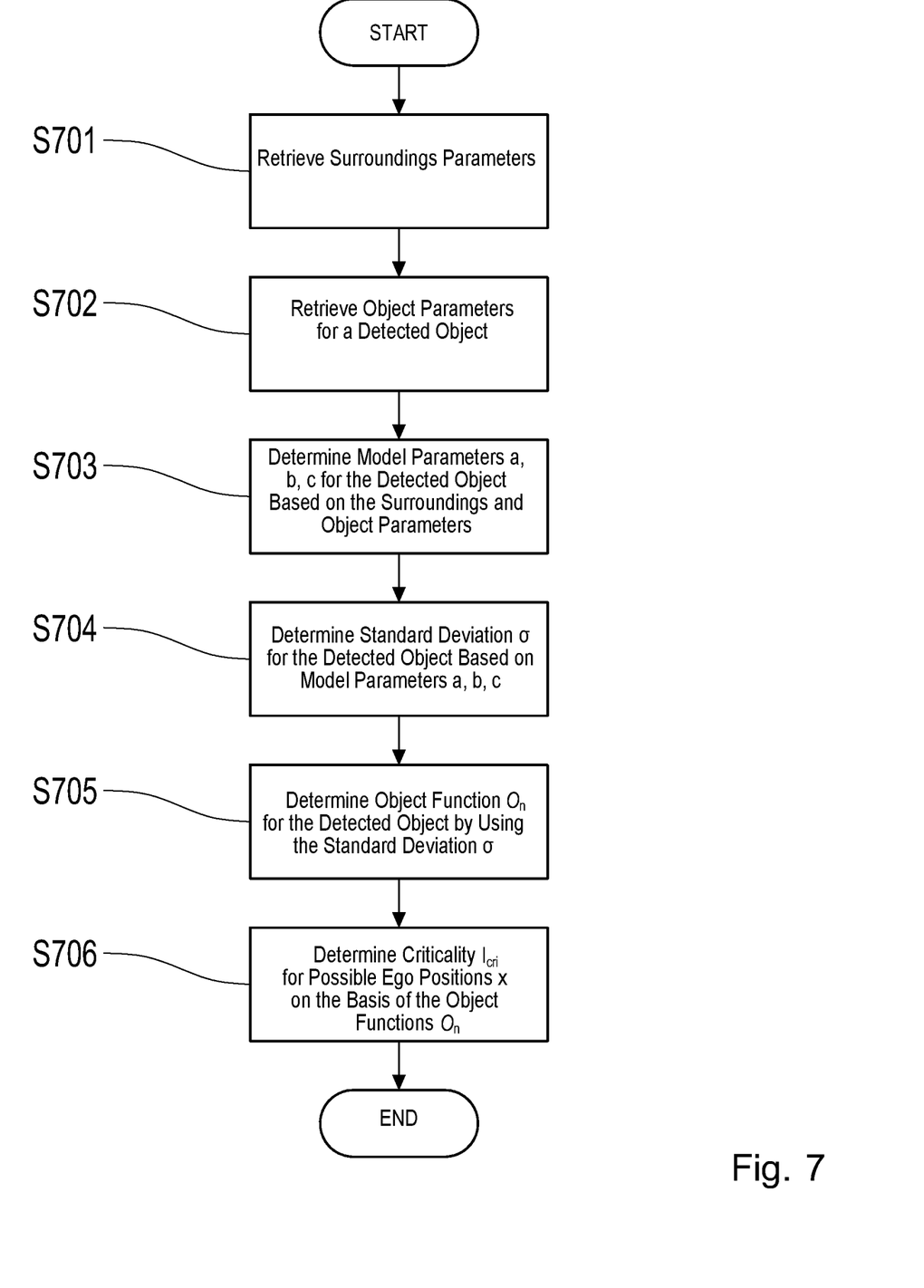
FIG. 7 schematically shows, in a flow chart, a method according to example aspects of the invention for the criticality determination of the type that is used on a control unit according to example aspects of the invention.

FIG. 7 schematically shows, in a flow chart, the steps of a method according to example aspects of the invention for the criticality determination of the type that is used on a control unit according to example aspects of the invention in an ego vehicle 10 according to example aspects of the invention. For the sake of simplicity, only one spatial dimension is taken into account in the method described.

In a first step S701, the control unit according to example aspects of the invention (22 in FIG. 1) receives surroundings parameters, such as temperature, road condition, atmospheric humidity, etc. In a second step S721, the control unit according to example aspects of the invention (22 in FIG. 1) receives object parameters, such as position, velocity, acceleration, extent, etc., for a detected object. In a third step S703, the control unit according to example aspects of the invention (22 in FIG. 1) determines, for the detected object, model parameters a, b and c based on the surroundings and object parameters. This can be carried out by multivariate regression of measured data present in a database or by an artificial neural network. In a fourth step S704, the control unit according to example aspects of the invention (22 in FIG. 1) determines a standard deviation $$\sigma = a \cdot v^2 + b \cdot v + c$$

wherein v represents the velocity of the detected object. In a fifth step S705, the control unit according to example aspects of the invention (22 in FIG. 1) determines a location-dependent object function based on the determined standard deviation a $$O(x, x_0) = \frac{1}{\tilde{M}_n} e^{-\frac{1}{2}\left(\frac{(x-x_0)}{\sigma_i}\right)^2}$$

wherein $\tilde{M}$ represents a normalizing constant and $x_0$ represents the position of the detected object. Similarly, an ego object function is determined for the ego vehicle 10. In a sixth step S706, the control unit according to example aspects of the invention (22 in FIG. 1) determines a criticality for possible ego positions x based on this object function and the ego object function $$I_{cri}(x) = \sum_{n=1}^{N} \frac{1}{N} \int O_{ego}(\tilde{x}, x) \cdot O_n(\tilde{x}, x_{n,0}) d\tilde{x}$$

These criticality maps and the location-dependent criticality values can then be transferred to an external service, which carries out trajectory planning based thereon. This trajectory planning can be carried out, for example, by planning a trajectory, for which $I_{cri} < 0,8$, applies at all times and at all locations of the trajectory.

It is to be noted at this point that the sixth step S706 can also be carried out on the control unit according to example aspects of the invention, although it makes sense to carry out the trajectory planning in a separate control unit due to improved modularization.

In order to save calculation work in the control unit according to example aspects of the invention, which is installed in the vehicle 10 itself, it is also possible to carry out the steps S702-S705 on an on-line server, to which the control unit according to example aspects of the invention is connected via the Internet.

Nowadays, the criticality determination that has been described is already capable of handling (non-existent) free space and limitations (by adding crash potentials to the limits). Future challenges are the issue of the response to the criticality per scenario with respect to velocities and directions, the issue of the use of the response to obtain critical (a threshold value is to be defined) scenarios by microscopic simulation or a field test, and the issue of the use of the response in the fully parameterized nanoscopic simulation in order to correct the response in the full parameter set, and the issue of filtering stochastic scenarios with the aid of the response in areas related to SOTIF [Safety Of The Intended Functionality] (known but unsafe).

In FIGS. 4a, 4b, and 4c, it was shown how a grid map can be created on the basis of, for example, radar or LIDAR data, the grid map describing the surroundings of the sensors according to example aspects of the invention. The creation of a criticality map can be placed over this grid map, although is not limited thereto. Generally, the present method according to example aspects of the invention for creating a criticality map or for a criticality determination is not limited to sensor data in grid maps or point clouds, let alone radar or LIDAR data. Instead, the method according to example aspects of the invention can be applied to all types of sensor data that permit a reliable detection of objects, distance, and velocity.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

10 vehicle (ego vehicle)
20 object vehicle (vehicle of another road user)
12 ECU 1 braking system
14 ECU 2 drive train
16 ECU 3 steering system
18 ECU 5 autonomous driving
22 ECU 4 sensor processing
24 GNSS
25 HMI
26 surroundings sensors
31 viewing range of the sensor
32 object (vehicle)
33 grid map
34 cell of the grid map having a high occupancy probability
35 cell of the grid map having a low occupancy probability
41 CPU
42 RAM
43 ROM
45 CAN-IF
44 memory unit
46 communication system
47 application-specific integrated circuit
61 dynamic object 1 (vehicle)
62 dynamic object 2 (vehicle)
63 static object 1 (building)
64 static object 2 (building)
$P_i$ points (detections)

The invention claimed is:

1. A control unit (22), comprising:
one or more processors; and
one or more non-transitory computer-readable media that store instructions that, when executed by the one or more processors, cause the control unit (22) to perform operations, the operations comprising:
calculating a criticality ($I_{cri}$) of a driving situation as an overlap integral of an object function ($O_{ego}$) of an ego vehicle (10) with one or more object functions ($O_n$) of one or more of other road users, other static objects, or other dynamic objects in the surroundings of the ego vehicle (10),
wherein each of the one or more object functions ($O_n$) of the one or more of the other road users or the other dynamic objects of the surroundings of the ego vehicle is determined by a standard deviation ($\sigma$), and the operations further comprise determining the standard deviation with a polynomial model $$\sigma_i = \sum_{j=1}^{J} a_{i,j} \cdot v^j + c_{i,ext}$$

wherein v represents an object velocity, $a_{i,j}$ represents an object acceleration parameter, and $c_{i,ext}$ represents one or more surroundings parameters, and the object acceleration parameter $a_j$ and the one or more surroundings parameters $c_{ext}$ are individually determined with a multivariate regression or with a neural network from a set of known braking distance data.

2. The control unit (22) of claim 1, wherein the driving situation is predefined by a potential position of the ego vehicle (10) and by surroundings parameters and object parameters of the one or more of the other road users, the other static objects, or the other dynamic objects in the surroundings of the ego vehicle.

3. The control unit (22) of claim 1, the operations further comprising performing an object detection based on sensor data received from surroundings sensors (26) in order to detect one or more other objects including the one or more of the other road users, the other static objects, or the other dynamic objects (61, 62) in the surroundings of the ego vehicle and ascertain object parameters with respect to the one or more other objects (61, 62).

4. The control unit (22) of claim 1, wherein each respective one of the one or more object functions ($O_n$) of the one or more of the other road users, the other static objects, or the other dynamic objects of the surroundings of the ego vehicle comprises a Gaussian distribution indicating a hazard potential posed by a respective object of the one or more of the other road users, the other static objects, or the other dynamic objects of the surroundings of the ego vehicle.

5. The control unit (22) of claim 4, wherein the Gaussian distribution is determined by the standard deviation ($\sigma$) parameterizing a hazard zone around the respective object.

6. The control unit (22) of claim 4, wherein each respective one of the one or more object functions ($O_n$) of the one or more of the other road users, the other static objects, or the other dynamic objects of the surroundings of the ego vehicle is defined by $$O_n(x, x_0) = \frac{1}{\tilde{M}_n} e^{-\frac{1}{2}\left(\Sigma_{i=1}^{3}\left(\frac{(x_i - x_{i,0})}{\sigma_i}\right)^2\right)},$$

with i=1,2,3; $\tilde{M}$ a normalizing constant; $\sigma=(\sigma_1, \sigma_2, \sigma_3)$ the standard deviation $\sigma=(\sigma_1, \sigma_2, \sigma_3)$ of the object function ($O_n$); and $x_0=(x_{1,0}, x_{2,0}, x_{3,0})$ the location of the respective object.

7. The control unit (22) of claim 4, wherein the Gaussian distribution is determined by the standard deviation ($\sigma$).

8. The control unit (22) of claim 1, wherein the one or more surroundings parameters comprise one or more of an ambient temperature, a road condition, a visual range, or a position of the sun.

9. The control unit (22) of claim 1, wherein the standard deviation ($\sigma$) of each respective one of the one or more object functions ($O_n$) of the one or more of the other road users or the other dynamic objects of the surroundings of the ego vehicle is further determined on the basis of an estimated braking distance(s) of the respective object.

10. The control unit (22) of claim 1, wherein the operations further comprise determining the criticality ($I_{cri}$) of the driving situation with the following $$I_{cri} = \frac{1}{N} \sum_{n=1}^{N} \iiint O_{ego} \cdot O_n \, dx \, dy \, dz,$$

and
wherein i indicates one or more detected objects including the one or more of the other road users, the other static objects, or the other dynamic objects, N designates the total number of the one or more detected objects, $O_{ego}$ represents the object function of the ego vehicle, and $O_i$ represents the object function of a respective one of the one or more detected objects.

11. The control unit (22) of claim 1, wherein the criticality $I_{cri}$ is normalized such that, when the ego vehicle contacts another object, the criticality is equal to one (1).

12. The control unit (22) of claim 1, wherein the operations further comprise ascertaining a plurality of criticalities ($I_{cri}(x, y)$) for particular driving situations having different potential positions ((x, y)) of the ego vehicle in order to obtain a criticality map for each of the plurality of criticalities ($I_{cri}(x, y)$).

13. A method, comprising:
calculating, with one or more processors, a criticality ($I_{cri}$) of a driving situation as an overlap integral of an object function ($O_{ego}$) of an ego vehicle (10) with one or multiple object functions ($O_n$) of one or more of other road users, other static objects, or other dynamic objects in the surroundings of the ego vehicle (10),
wherein each of the one or more object functions ($O_n$) of the one or more of the other road users or the other dynamic objects of the surroundings of the ego vehicle is determined by a standard deviation ($\sigma$), and the operations further comprise determining the standard deviation with a polynomial model $$\sigma_i = \Sigma_{j=1}^{J} a_{i,j} \cdot v^j + c_{i,ext}$$

wherein v represents an object velocity, $a_{i,j}$ represents an object acceleration parameter, and $c_{i,ext}$ represents one or more surroundings parameters, and the object acceleration parameter $a_j$ and the one or more surroundings parameters cow are individually determined with a multivariate regression or with a neural network from a set of known braking distance data.

14. The control unit (22) of claim 1, the operations further comprising transmitting the criticality ($I_{cri}$) of the driving situation to an autonomous driving control unit (18), the autonomous driving control unit (18) autonomously controlling the ego vehicle based at least in part on the criticality ($I_{cri}$) of the driving situation.

15. A vehicle (10), comprising:
at least one actuator;
one or more vehicle sub-systems (12, 14, 16) for controlling one or more of the at least one actuator;
an autonomous driving control unit (18); and
the control unit (22) of claim 1, the ego vehicle being the vehicle (10), wherein the operations of the control unit (22) further comprise transmitting the criticality ($I_{cri}$) of the driving situation to the autonomous driving control unit (18), wherein the autonomous driving control unit (18) autonomously controls the one or more vehicle sub-systems (12, 14, 16) based at least in part on the criticality ($I_{cri}$) of the driving situation.

16. The vehicle (10) of claim 15, further comprising one or more surroundings sensors configured to generate sensor data,
   wherein the operations of the control unit (22) further comprise detecting the one or more other objects including the one or more of the other road users, the other static objects, or the other dynamic objects (61, 62) in the surroundings of the ego vehicle based on the sensor data.

\* \* \* \* \*